US012705719B2

(12) United States Patent
Zhang et al.

(10) Patent No.: US 12,705,719 B2
(45) Date of Patent: Aug. 11, 2026

(54) IMAGE PROCESSING METHOD AND APPARATUS, AND STORAGE MEDIUM

(71) Applicant: Yinwang Intelligent Technologies Co., Ltd., Shenzhen (CN)

(72) Inventors: Yi Zhang, Hangzhou (CN); Guangyao Qin, Dongguan (CN)

(73) Assignee: YINWANG INTELLIGENT TECHNOLOGIES CO., LTD., Shenzhen (CN)

(*) Notice: Subject to any disclaimer, the term of this patent is extended or adjusted under 35 U.S.C. 154(b) by 239 days.

(21) Appl. No.: 18/647,644

(22) Filed: Apr. 26, 2024

(65) Prior Publication Data

US 2024/0273699 A1 Aug. 15, 2024

Related U.S. Application Data

(63) Continuation of application No. PCT/CN2022/113972, filed on Aug. 22, 2022.

(30) Foreign Application Priority Data

Oct. 29, 2021 (CN) ........................ 202111269694.5

(51) Int. Cl.
*G06T 7/00* (2017.01)
*G06V 10/764* (2022.01)
*G06V 20/70* (2022.01)

(52) U.S. Cl.
CPC .......... *G06T 7/0002* (2013.01); *G06V 10/764* (2022.01); *G06V 20/70* (2022.01); *G06T 2207/20084* (2013.01); *G06T 2207/30168* (2013.01)

(58) Field of Classification Search
None
See application file for complete search history.

(56) References Cited

U.S. PATENT DOCUMENTS

2016/0379352 A1 12/2016 Zhang et al.
2020/0372682 A1 11/2020 Kim et al.
(Continued)

FOREIGN PATENT DOCUMENTS

CN 103471709 A 12/2013
CN 111327824 A 6/2020
CN 111988544 A 11/2020
(Continued)

OTHER PUBLICATIONS

Fang Yuming et al: "Perceptual QualityAssessment of Smartphone Photography", 2020 IEEE/CVF Conference on Computer Vision and Pattern Recognition (CVPR)IEEE, Jun. 13, 2020 (Jun. 13, 2020), pp. 3674-3683, XP033804754.
(Continued)

*Primary Examiner* — Leon Flores
(74) *Attorney, Agent, or Firm* — Conley Rose, P.C.

(57) ABSTRACT

A method includes: processing a captured original image based on an image signal processor (ISP) parameter, to obtain a target image; invoking, based on the target image, a pre-trained image quality assessment model to output and obtain a target assessment result, where the target assessment result indicates image quality of the assessed target image; and adjusting the ISP parameter based on the target assessment result.

20 Claims, 5 Drawing Sheets

(56) References Cited

U.S. PATENT DOCUMENTS

2021/0125310 A1* 4/2021 Pu ............................ G06T 5/60
2021/0174262 A1 6/2021 Du et al.

FOREIGN PATENT DOCUMENTS

JP 2016103807 A 6/2016
WO 2018216280 A1 11/2018

OTHER PUBLICATIONS

Huang Chen-Hsiu et al: "Multi-Task Deep CNN Model for No-Reference Image Quality Assessment on Smartphone Camera Photos", Aug. 27, 2020 (Aug. 27, 2020), XP093233514, total 7 pages.

* cited by examiner

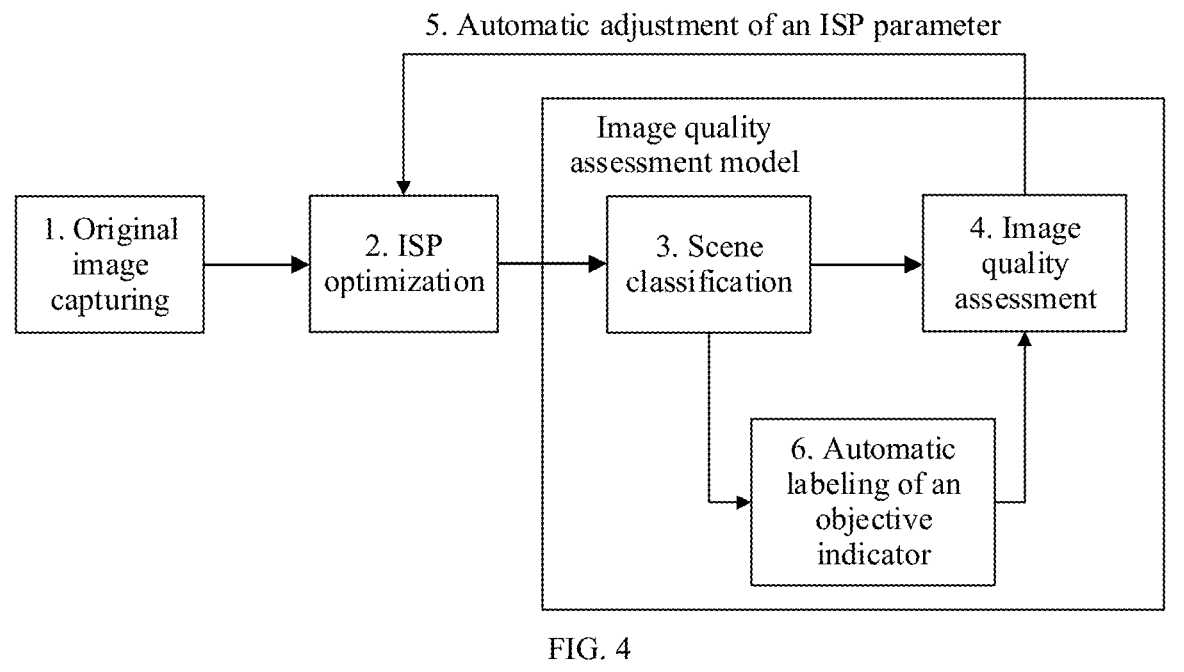

5. Automatic adjustment of an ISP parameter

Image quality assessment model

1. Original image capturing

2. ISP optimization

3. Scene classification

4. Image quality assessment

6. Automatic labeling of an objective indicator

FIG. 4

IMAGE PROCESSING METHOD AND APPARATUS, AND STORAGE MEDIUM

CROSS-REFERENCE TO RELATED APPLICATIONS

This is a continuation of International Patent Application No. PCT/CN2022/113972 filed on Aug. 22, 2022, which claims priority to Chinese Patent Application No. 202111269694.5 filed on Oct. 29, 2021. The aforementioned applications are hereby incorporated by reference in their entireties.

TECHNICAL FIELD

This disclosure relates to the field of artificial intelligence technologies, and in particular, to an image processing method and apparatus, and a storage medium.

BACKGROUND

In the field of autonomous driving, quality of an image output by a camera depends on an image signal processor (ISP) technology in addition to a module, a process, and the like of the camera.

In some systems, as shown in FIG. 1, an imaging process includes: a scenic object is photographed by using a lens 11; a generated optical image is projected onto a surface of a photosensitive sensor 12; then the optical image is converted into an analog electrical signal through optical-electrical conversion; noise of the analog electrical signal is removed, and then a processed analog electrical signal is converted into a digital image signal by an analog-to-digital converter 13; the digital image signal is input to a digital signal processing chip (DSP) 14 for processing by the DSP 14; and then data in a luma-chroma format (e.g., YUV) or a red-green-blue (RGB) format is output and transmitted to a central processing unit (CPU) through an input/output (I/O) interface for processing, and finally processed data is converted into an image displayed on a screen of an electronic device. A structural framework of the DSP 14 includes an ISP, an image decoder (e.g., Joint Photographic Experts Group (JPEG)), and a Universal Serial Bus (USB) device controller.

The ISP is configured to perform post processing on data output by the photosensitive sensor, and has main functions including black level compensation, lens correction, bad pixel correction, color interpolation (demosaicing), noise removal, white balance correction, color correction, gamma correction, color space conversion (for example, conversion from RGB into YUV), chroma noise removal and edge enhancement as well as color and contrast enhancement in YUV color space, automatic exposure control, and the like. Details of a scene can be better restored in different optical conditions by using the ISP. The ISP technology determines imaging quality of the camera to a large extent.

Currently, image quality of the camera in the field of autonomous driving depends on an ISP parameter. However, a debugging effect of the ISP parameter depends on a debugging environment, a parameter labeling method, experience of debugging personnel, and the like, and the debugging effect is poor.

SUMMARY

In view of this, an image processing method and apparatus, and a storage medium are proposed, to automatically adjust an ISP parameter based on a target assessment result output by an image quality assessment model, so as to ensure a debugging effect of the ISP parameter, and improve subsequent image quality obtained after ISP processing.

According to a first aspect, an embodiment of this disclosure provides an image processing method. The method includes: processing a captured original image based on an ISP parameter, to obtain a target image; invoking, based on the target image, a pre-trained image quality assessment model to output and obtain a target assessment result, where the image quality assessment model is a model obtained by training a neural network by using a sample image, and the target assessment result indicates image quality of the assessed target image; and adjusting the ISP parameter based on the target assessment result.

In this implementation, the captured original image is processed based on the ISP parameter, to obtain the target image. The image quality assessment model is invoked based on the target image, to output the target assessment result indicating the image quality. The ISP parameter is automatically adjusted based on the target assessment result. This ensures a debugging effect of the ISP parameter, thereby improving the subsequent image quality obtained after ISP processing.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In this implementation, the target assessment result includes the objective quality information and the subjective quality information of the target image, so that a parameter output by the image quality assessment model can indicate the assessed quality status of the target image in terms of the objective indicator and/or subjective aesthetics. This further ensures an assessment effect of the image quality assessment model.

In another possible implementation, the image quality assessment model includes a scene classification layer, an objective scoring layer, and a subjective scoring layer, and the invoking, based on the target image, a pre-trained image quality assessment model to output and obtain a target assessment result includes: inputting the target image to the scene classification layer to output and obtain a scene classification result; and inputting the target image and the scene classification result to the objective scoring layer to output and obtain the objective quality information, and inputting the target image and the scene classification result to the subjective scoring layer to output and obtain the subjective quality information.

In this implementation, the scene classification layer is introduced into the image quality assessment model. An electronic device inputs the target image to the scene classification layer to output and obtain the scene classification result, inputs the target image and the scene classification result to the objective scoring layer to output and obtain the objective quality information, and inputs the target image and the scene classification result to the subjective scoring layer to output and obtain the subjective quality information. This provides a multi-task image processing method, so that ISP parameters in terms of different scene types can be automatically optimized subsequently, to improve image quality in each scene.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In this implementation, the objective quality information can include the objective score value corresponding to the specified dimension, and the subjective quality information may include the subjective score value corresponding to the specified dimension. This enriches output parameters of the image quality assessment model, thereby further ensuring the assessment effect of the image quality assessment model.

In another possible implementation, the ISP parameter includes at least one of brightness, a color, a contrast ratio, definition, and noise, and the adjusting the ISP parameter based on the target assessment result includes: for each specified dimension, determining, based on the objective score value and the subjective score value that correspond to the specified dimension, a target score value corresponding to the specified dimension; and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In this implementation, the target score value corresponding to the specified dimension is determined based on the objective score value and the subjective score value that correspond to the specified dimension, and the ISP parameter corresponding to the specified dimension is adjusted based on the target score value corresponding to the specified dimension and the preset parameter threshold. This can automatically optimize the ISP parameters in terms of the different scene types, improve image quality in each scene, and automatically adapt to an all-weather scene during autonomous driving, thereby meeting an image quality requirement of an autonomous driving perception algorithm.

In another possible implementation, before the invoking, based on the target image, a pre-trained image quality assessment model to output and obtain a target assessment result, the method further includes: obtaining the image quality assessment model, where the image quality assessment model is obtained through training based on at least one sample data group, and each sample data group includes the sample image and a pre-labeled correct assessment result.

In this implementation, the image quality assessment model is obtained through training based on the at least one sample data group, and each sample data group includes the sample images and the pre-labeled correct assessment result. This helps in subsequently outputting the target assessment result based on the trained image quality assessment model, thereby automatically adjusting the ISP parameter, and providing a prerequisite for debugging the ISP parameter.

In another possible implementation, before the obtaining the image quality assessment model, the method further includes: obtaining a training sample set, where the training sample set includes the at least one sample data group; for each of the at least one sample data group, inputting the sample image to an original parameter model to obtain a training result, where the original parameter model is a multi-task neural network model; comparing the training result with the correct assessment result to obtain a calculation loss, where the calculation loss indicates an error between the training result and the correct assessment result; and obtaining the image quality assessment model through training based on a calculation loss corresponding to each of the at least one sample data group.

In this implementation, a possible solution of training the image quality assessment model based on the training sample set is provided. The image quality assessment model is obtained through training based on the calculation loss corresponding to each of the at least one sample data group. This ensures the assessment effect of the trained image quality assessment model.

In another possible implementation, after the invoking, based on the target image, an image quality assessment model to output and obtain a target assessment result, the method further includes: performing automatic labeling on the target image to obtain label information, where the label information includes an objective label value corresponding to the specified dimension; performing screening in the training sample set based on the label information, to obtain a screened training sample set; and training the image quality assessment model based on the screened training sample set, to obtain an updated image quality assessment model.

In this implementation, an objective indicator automatic labeling method is provided. The objective label value of the target image in the specified dimension can be automatically labeled, and the training sample set is screened based on the label information. This optimizes quality of a sample in the training sample set, improves stability of the image quality assessment model, and improves precision of a subsequent image processing method.

According to a second aspect, an embodiment of this disclosure provides an image quality assessment method. The method includes: processing a captured original image based on an ISP parameter, to obtain a target image; and invoking, based on the target image, a pre-trained image quality assessment model to output and obtain a target assessment result, where the image quality assessment model is a model obtained by training a neural network by using a sample image, and the target assessment result indicates image quality of the assessed target image.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer, and the invoking, based on the target image, a pre-trained image quality assessment model to output and obtain a target assessment result includes: inputting the target image to the scene classification layer to output and obtain a scene classification result; and inputting the target image and the scene classification result to the objective scoring layer to output and obtain the objective quality information, and inputting the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise, and the method further includes: for each specified dimension, determining, based on the objective score value and the subjective score value that correspond to the specified dimension, a target score value corresponding to the specified dimension; and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, before the invoking, based on the target image, a pre-trained image quality assessment model to output and obtain a target assessment result, the method further includes: obtaining the image quality assessment model, where the image quality assessment model is obtained through training based on at least one sample data group, and each sample data group includes the sample image and a pre-labeled correct assessment result.

In another possible implementation, before the obtaining the image quality assessment model, the method further includes: obtaining a training sample set, where the training sample set includes the at least one sample data group; for each of the at least one sample data group, inputting the sample image to an original parameter model to obtain a training result, where the original parameter model is a multi-task neural network model; comparing the training result with the correct assessment result to obtain a calculation loss, where the calculation loss indicates an error between the training result and the correct assessment result; and obtaining the image quality assessment model through training based on a calculation loss corresponding to each of the at least one sample data group.

In another possible implementation, after the invoking, based on the target image, an image quality assessment model to output and obtain a target assessment result, the method further includes: performing automatic labeling on the target image to obtain label information, where the label information includes an objective label value corresponding to the specified dimension; performing screening in the training sample set based on the label information, to obtain a screened training sample set; and training the image quality assessment model based on the screened training sample set, to obtain an updated image quality assessment model.

According to a third aspect, an embodiment of this disclosure provides a method for automatically improving image quality. The method includes: processing a captured original image based on an ISP parameter, to obtain a target image; and invoking, based on the target image, a pre-trained image quality assessment model to output and obtain a target assessment result, where the image quality assessment model is a model obtained by training a neural network by using a sample image, and the target assessment result indicates image quality of the assessed target image; adjusting the ISP parameter based on the target assessment result; and processing a captured first image based on the adjusted ISP parameter, to obtain a second image.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer, and the invoking, based on the target image, a pre-trained image quality assessment model to output and obtain a target assessment result includes: inputting the target image to the scene classification layer to output and obtain a scene classification result; and inputting the target image and the scene classification result to the objective scoring layer to output and obtain the objective quality information, and inputting the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise, and the adjusting the ISP parameter based on the target assessment result includes: for each specified dimension, determining, based on the objective score value and the subjective score value that correspond to the specified dimension, a target score value corresponding to the specified dimension; and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, before the invoking, based on the target image, a pre-trained image quality assessment model to output and obtain a target assessment result, the method further includes: obtaining the image quality assessment model, where the image quality assessment model is obtained through training based on at least one sample data group, and each sample data group includes the sample image and a pre-labeled correct assessment result.

In another possible implementation, before the obtaining the image quality assessment model, the method further includes: obtaining a training sample set, where the training sample set includes the at least one sample data group; for each of the at least one sample data group, inputting the sample image to an original parameter model to obtain a training result, where the original parameter model is a multi-task neural network model; comparing the training result with the correct assessment result to obtain a calculation loss, where the calculation loss indicates an error between the training result and the correct assessment result; and obtaining the image quality assessment model through training based on a calculation loss corresponding to each of the at least one sample data group.

In another possible implementation, after the invoking, based on the target image, an image quality assessment model to output and obtain a target assessment result, the method further includes: performing automatic labeling on the target image to obtain label information, where the label information includes an objective label value corresponding to the specified dimension; performing screening in the training sample set based on the label information, to obtain a screened training sample set; and training the image quality assessment model based on the screened training sample set, to obtain an updated image quality assessment model.

According to a fourth aspect, an embodiment of this disclosure provides an objective indicator labeling method. The method includes: processing a captured original image based on an ISP parameter, to obtain a target image; performing automatic labeling on the target image to obtain label information, where the label information includes an objective label value corresponding to a specified dimension; performing screening in a training sample set based on the label information, to obtain a screened training sample set; and training a pre-trained image quality assessment model based on the screened training sample set, to obtain an updated image quality assessment model, where the image quality assessment model is a neural network model used to assess image quality.

In a possible implementation, before the training a pre-trained image quality assessment model based on the screened training sample set, to obtain an updated image quality assessment model, the method further includes: invoking, based on the target image, the image quality assessment model to output and obtain a target assessment result, where the image quality assessment model is a model obtained by training a neural network by using a sample image, and the target assessment result indicates image quality of the assessed target image; and adjusting the ISP parameter based on the target assessment result.

In another possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer, and the invoking, based on the target image, the image quality assessment model to output and obtain a target assessment result includes: inputting the target image to the scene classification layer to output and obtain a scene classification result; and inputting the target image and the scene classification result to the objective scoring layer to output and obtain the objective quality information, and inputting the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise, and the adjusting the ISP parameter based on the target assessment result includes: for each specified dimension, determining, based on the objective score value and the subjective score value that correspond to the specified dimension, a target score value corresponding to the specified dimension; and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, before the invoking, based on the target image, a pre-trained image quality assessment model to output and obtain a target assessment result, the method further includes: obtaining the image quality assessment model, where the image quality assessment model is obtained through training based on at least one sample data group, and each sample data group includes the sample image and a pre-labeled correct assessment result.

In another possible implementation, before the obtaining the image quality assessment model, the method further includes: obtaining the training sample set, where the training sample set includes the at least one sample data group; for each of the at least one sample data group, inputting the sample image to an original parameter model to obtain a training result, where the original parameter model is a multi-task neural network model; comparing the training result with the correct assessment result to obtain a calculation loss, where the calculation loss indicates an error between the training result and the correct assessment result; and obtaining the image quality assessment model through training based on a calculation loss corresponding to each of the at least one sample data group.

According to a fifth aspect, an embodiment of this disclosure provides a camera. The camera includes an ISP and a processor.

The processor is configured to perform the method according to any one of the first aspect or the possible implementations of the first aspect, or configured to perform the method according to any one of the second aspect or the possible implementations of the second aspect, or configured to perform the method according to any one of the third aspect or the possible implementations of the third aspect, or configured to perform the method according to any one of the fourth aspect or the possible implementations of the fourth aspect.

According to a sixth aspect, an embodiment of this disclosure provides a vehicle. The vehicle includes: a processor; and a memory configured to store instructions executable by the processor.

When executing the instructions, the processor is configured to implement the method according to any one of the first aspect or the possible implementations of the first aspect, or implement the method according to any one of the second aspect or the possible implementations of the second aspect, or perform the method according to any one of the third aspect or the possible implementations of the third aspect, or implement the method according to any one of the fourth aspect or the possible implementations of the fourth aspect.

According to a seventh aspect, an embodiment of this disclosure provides an image processing apparatus. The apparatus includes: a processing unit configured to process a captured original image based on an ISP parameter, to obtain a target image; an output unit configured to invoke, based on the target image, a pre-trained image quality assessment model to output and obtain a target assessment result, where the image quality assessment model is a model obtained by training a neural network by using a sample image, and the target assessment result indicates image quality of the assessed target image; and an adjustment unit configured to adjust the ISP parameter based on the target assessment result.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer. The output unit is further configured to: input the target image to the scene classification layer to output and obtain a scene classification result; and input the target image and the scene classification result to the objective scoring layer to output and obtain the objective quality information, and input the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise. The adjustment unit is further configured to: for each specified dimension, determine based on the objective score value and the subjective score value that correspond to the specified dimension, a target score value corresponding to the specified dimension; and adjust, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, the apparatus further includes an obtaining unit.

The obtaining unit is configured to obtain the image quality assessment model. The image quality assessment model is obtained through training based on at least one sample data group, and each sample data group includes the sample image and a pre-labeled correct assessment result.

In another possible implementation, the apparatus further includes a training unit. The training unit is configured to: obtain a training sample set, where the training sample set includes the at least one sample data group; for each of the at least one sample data group, input the sample image to an original parameter model to obtain a training result, where the original parameter model is a multi-task neural network model; compare the training result with the correct assessment result to obtain a calculation loss, where the calculation loss indicates an error between the training result and the correct assessment result; and obtain the image quality assessment model through training based on a calculation loss corresponding to each of the at least one sample data group.

In another possible implementation, the apparatus further includes a retraining unit. The retraining unit is configured to: perform automatic labeling on the target image to obtain label information, where the label information includes an objective label value corresponding to the specified dimension; perform screening in the training sample set based on the label information, to obtain a screened training sample set; and train the image quality assessment model based on the screened training sample set, to obtain an updated image quality assessment model.

According to an eighth aspect, an embodiment of this disclosure provides an image quality assessment apparatus. The apparatus includes: a processing unit configured to process a captured original image based on an ISP parameter, to obtain a target image; and an output unit configured to invoke, based on the target image, a pre-trained image quality assessment model to output and obtain a target assessment result, where the image quality assessment model is a model obtained by training a neural network by using a sample image, and the target assessment result indicates image quality of the assessed target image.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer. The output unit is further configured to: input the target image to the scene classification layer to output and obtain a scene classification result; and input the target image and the scene classification result to the objective scoring layer to output and obtain the objective quality information, and input the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise. The apparatus further includes an adjustment unit. The adjustment unit is configured to: for each specified dimension, determine based on the objective score value and the subjective score value that correspond to the specified dimension, a target score value corresponding to the specified dimension; and adjust, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, the apparatus further includes an obtaining unit. The obtaining unit is configured to: obtain the image quality assessment model, where the image quality assessment model is obtained through training based on at least one sample data group, and each sample data group includes the sample image and a pre-labeled correct assessment result.

In another possible implementation, the apparatus further includes: a training unit. The training unit is configured to: obtain a training sample set, where the training sample set includes the at least one sample data group; for each of the at least one sample data group, input the sample image to an original parameter model to obtain a training result, where the original parameter model is a multi-task neural network model; compare the training result with the correct assessment result to obtain a calculation loss, where the calculation loss indicates an error between the training result and the correct assessment result; and obtain the image quality assessment model through training based on a calculation loss corresponding to each of the at least one sample data group.

In another possible implementation, the apparatus further includes a retraining unit. The retraining unit is configured to: perform automatic labeling on the target image to obtain label information, where the label information includes an objective label value corresponding to the specified dimension; perform screening in the training sample set based on the label information, to obtain a screened training sample set; and train the image quality assessment model based on the screened training sample set, to obtain an updated image quality assessment model.

According to a ninth aspect, an embodiment of this disclosure provides an apparatus for automatically improving image quality. The apparatus includes: a first processing unit configured to process a captured original image based on an ISP parameter, to obtain a target image; and an output unit configured to invoke, based on the target image, a pre-trained image quality assessment model to output and obtain a target assessment result, where the image quality assessment model is a model obtained by training a neural network by using a sample image, and the target assessment result indicates image quality of the assessed target image; an adjustment unit configured to adjust the ISP parameter based on the target assessment result; and a second processing unit configured to process a captured first image based on the adjusted ISP parameter, to obtain a second image.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer. The output unit is further configured to: input the target image to the scene classification layer to output and obtain a scene classification result; and input the target image and the scene classification result to the objective scoring layer to output and obtain the objective quality information, and input the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise. The adjustment unit is further configured to: for each specified dimension, determine based on the objective score value and the subjective score value that correspond to the specified dimension, a target score value corresponding to the specified dimension; and adjust, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, the apparatus further includes an obtaining unit. The obtaining unit is configured to: obtain the image quality assessment model, where the image quality assessment model is obtained through training based on at least one sample data group, and each sample data group includes the sample image and a pre-labeled correct assessment result.

In another possible implementation, the apparatus further includes a training unit. The training unit is configured to: obtain a training sample set, where the training sample set includes the at least one sample data group; for each of the at least one sample data group, input the sample image to an original parameter model to obtain a training result, where the original parameter model is a multi-task neural network model; compare the training result with the correct assessment result to obtain a calculation loss, where the calculation loss indicates an error between the training result and the correct assessment result; and obtain the image quality assessment model through training based on a calculation loss corresponding to each of the at least one sample data group.

In another possible implementation, the apparatus further includes a retraining unit. The retraining unit is configured to: perform automatic labeling on the target image to obtain label information, where the label information includes an objective label value corresponding to the specified dimension; perform screening in the training sample set based on the label information, to obtain a screened training sample set; and train the image quality assessment model based on the screened training sample set, to obtain an updated image quality assessment model.

According to a tenth aspect, an embodiment of this disclosure provides an objective indicator labeling apparatus. The apparatus includes: a processing unit configured to process a captured original image based on an ISP parameter, to obtain a target image; a labeling unit configured to perform automatic labeling on the target image to obtain label information, where the label information includes an objective label value corresponding to a specified dimension; a screening unit configured to perform screening in a training sample set based on the label information, to obtain a screened training sample set; and a retraining unit configured to train a pre-trained image quality assessment model based on the screened training sample set, to obtain an updated image quality assessment model, where the image quality assessment model is a neural network model used to assess image quality.

In a possible implementation, the apparatus further includes: an output unit configured to invoke, based on the target image, the image quality assessment model to output and obtain a target assessment result, where the image quality assessment model is a model obtained by training a neural network by using a sample image, and the target assessment result indicates image quality of the assessed target image; and an adjustment unit configured to adjust the ISP parameter based on the target assessment result.

In another possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer. The output unit is further configured to: input the target image to the scene classification layer to output and obtain a scene classification result; and input the target image and the scene classification result to the objective scoring layer to output and obtain the objective quality information, and input the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise. The adjustment unit is further configured to: for each specified dimension, determine based on the objective score value and the subjective score value that correspond to the specified dimension, a target score value corresponding to the specified dimension; and adjust, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, the apparatus further includes an obtaining unit.

The obtaining unit is configured to obtain the image quality assessment model. The image quality assessment model is obtained through training based on at least one sample data group, and each sample data group includes the sample image and a pre-labeled correct assessment result.

In another possible implementation, the apparatus further includes a training unit. The training unit is configured to: obtain the training sample set, where the training sample set includes the at least one sample data group; for each of the at least one sample data group, input the sample image to an original parameter model to obtain a training result, where the original parameter model is a multi-task neural network model; compare the training result with the correct assessment result to obtain a calculation loss, where the calculation loss indicates an error between the training result and the correct assessment result; and obtain the image quality assessment model through training based on a calculation loss corresponding to each of the at least one sample data group.

According to an eleventh aspect, an embodiment of this disclosure provides a non-volatile computer-readable storage medium, storing computer program instructions. When the computer program instructions are executed by a processor, the method according to any one of the first aspect or the possible implementations of the first aspect is implemented, or the method according to any one of the second aspect or the possible implementations of the second aspect is implemented, or the method according to any one of the third aspect or the possible implementations of the third aspect is implemented, or the method according to any one of the fourth aspect or the possible implementations of the fourth aspect is implemented.

According to a twelfth aspect, an embodiment of this disclosure provides a computer program product. The computer program product includes computer-readable code or a non-volatile computer-readable storage medium carrying computer-readable code. When the computer-readable code is run on an electronic device, a processor in the electronic device performs the method according to any one of the first aspect or the possible implementations of the first aspect, or performs the method according to any one of the second aspect or the possible implementations of the second aspect, or performs the method according to any one of the third aspect or the possible implementations of the third aspect, or performs the method according to any one of the fourth aspect or the possible implementations of the fourth aspect.

BRIEF DESCRIPTION OF DRAWINGS

The accompanying drawings included in this specification and constituting a part of this specification and this specification jointly show example embodiments, features, and aspects of this disclosure, and are intended to explain the principles of this disclosure.

FIG. 1 is a schematic diagram of an imaging process;

FIG. 2 is a schematic diagram of a structure of an electronic device according to an example embodiment of this disclosure;

FIG. 4 is a flowchart of an image processing method according to another example embodiment of this disclosure;

DESCRIPTION OF EMBODIMENTS

Figure 3:
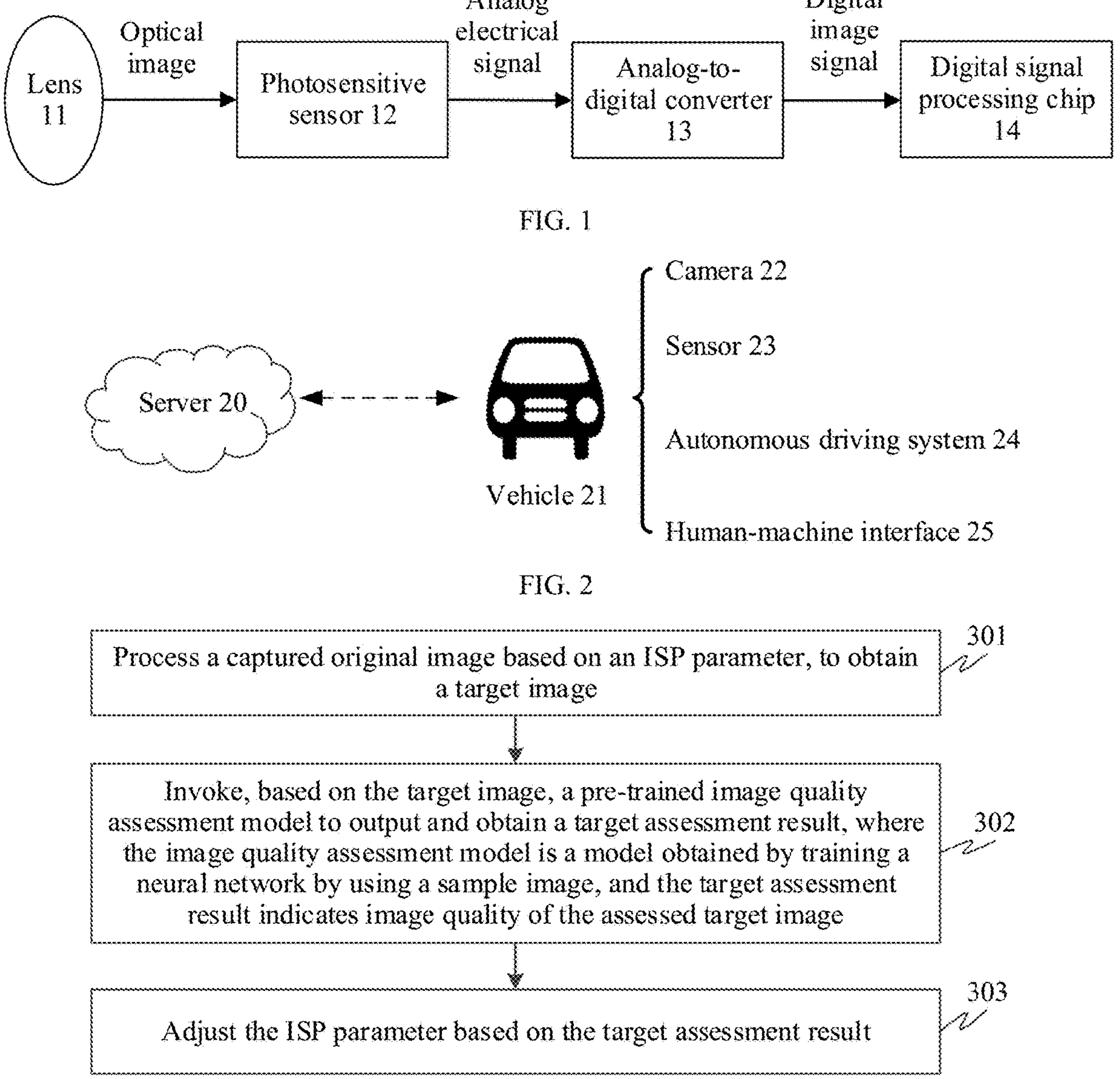
FIG. 3 is a flowchart of an image processing method according to an example embodiment of this disclosure.

The following describes various example embodiments, features, and aspects of this disclosure in detail with reference to the accompanying drawings. Identical reference signs in the accompanying drawings indicate elements that have same or similar functions. Although various aspects of embodiments are illustrated in the accompanying drawings, the accompanying drawings are not necessarily drawn to a scale unless otherwise specified.

The specific term "example" herein means "used as an example, embodiment, or illustration". Any embodiment described as an "example" is not necessarily explained as being superior or better than other embodiments.

In addition, to better describe this disclosure, numerous specific details are given in the following specific implementations. A person skilled in the art should understand that this disclosure can also be implemented without some specific details. In some instances, methods, manners, elements, and circuits that are well-known to a person skilled in the art are not described in detail, so that a subject matter of this disclosure is highlighted.

First, an application scenario of this disclosure is described.

A method and an apparatus provided in embodiments of this disclosure may be applied to the fields of intelligent vehicles, new energy vehicles, and the like. The following uses, for description, only an example in which the method provided in embodiments of this disclosure is performed by an electronic device. FIG. 2 is a schematic diagram of a structure of the electronic device according to an example embodiment of this disclosure. The electronic device may be applied to an autonomous driving (AD) or an advanced driver assistance system (ADAS) embedded platform.

The electronic device may include a vehicle 21. The vehicle 21 may be a vehicle having a wireless communication function. A vehicle-mounted terminal, a vehicle-mounted module, a vehicle-mounted unit, a chip (system), or another part or component of the vehicle 21 may be provided with the wireless communication function. In embodiments of this disclosure, the vehicle 21 may be in an autonomous driving state. In other words, the vehicle 21 fully autonomously drives, and is not controlled by a driver or uses only slight control by a driver.

A camera 22 is disposed on the vehicle 21. The camera 22 is configured to optimize an ISP parameter before delivery of the electronic device by using a pre-trained image quality assessment model. Optionally, the camera 22 includes a lens, an ISP, and a processor. The lens is configured to capture an original image. The ISP is configured to perform post processing on the original image, and has main functions including black level compensation, lens correction, bad pixel correction, color interpolation, noise removal, white balance correction, color correction, gamma correction, color space conversion (for example, conversion from RGB into YUV), chroma noise removal, edge enhancement, and color and contrast ratio enhancement in YUV color space, automatic exposure control, and the like. The processor is a newly added processor configured to enhance image quality. The processor is configured to automatically adjust the ISP parameter based on a target assessment result output by the image quality assessment model, to ensure a debugging effect of the ISP parameter, so as to improve subsequent image quality obtained after ISP processing.

In embodiments of this disclosure, the ISP is configured to process the captured original image to obtain a target image. The processor is configured to: obtain the target image, and invoke, based on the target image, the pre-trained image quality assessment model to output the target assessment result, where the image quality assessment model is a model obtained by training a neural network by using a sample image, and the target assessment result indicates image quality of the assessed target image; and adjust the ISP parameter based on the target assessment result.

At least one other sensor 23 may be further disposed on the vehicle 21, for example, a vehicle-mounted radio detection and ranging (radar) (for example, a millimeter-wave radar, a light detection and ranging (lidar), or an ultrasonic radar), a rain sensor, a vehicle attitude sensor (for example, a gyroscope), an inertial measurement unit (IMU), and a Global Navigation Satellite System (GNSS). The sensors 23 may be disposed on one vehicle 21, or may be disposed on a plurality of vehicles 21.

An autonomous driving system 24 may be further disposed on the vehicle 21. The autonomous driving system 24 may be configured to: generate, based on data collected by the sensor, an autonomous-driving policy used to cope with a road surface condition, and implement autonomous driving of the vehicle 21 according to the generated policy.

A human-machine interface (HMI) 25 may be further disposed on the vehicle 21. The HMI 25 may be configured to broadcast, by using a visual icon or in a manner of voice broadcast, a current road surface condition and a policy used by the autonomous driving system 24 for the vehicle 21, to remind a related driver and passenger.

In a possible implementation, the electronic device in embodiments of this disclosure may further include a server 20. The server 20 may be located in the vehicle 21 as a vehicle-mounted computing unit, or may be located on a cloud, may be a physical device, or may be a virtual device, for example, a virtual machine or a container, and has a wireless communication function. For example, the server 20 is a virtual device provided after resource pooling of servers (decoupled in space) that are at a plurality of locations. A chip (a system) or another part or component of the server 20 may be provided with the wireless communication function. The server 20 may communicate with the vehicle 21 through a wireless connection, for example, by using a mobile communication technology like 2G/3G/4G/5G, or through wireless communication such as WI-FI, BLUETOOTH, frequency modulation (FM), a radio modem, or satellite communication. For example, in a test, the server 20 may be carried on the vehicle 21 and communicate with the vehicle 21 through the wireless connection. Through communication between the vehicle 21 and the server 20, the server 20 may collect, for calculation, data collected by sensors in one or more vehicles 21 or disposed on a road or at another location, and return a calculation result back to a corresponding vehicle 21.

The following describes, by using several example embodiments, an image processing method provided in embodiments of this disclosure.

FIG. 3 is a flowchart of an image processing method according to an example embodiment of this disclosure. In this embodiment, an example in which the method is applied to the electronic device shown in FIG. 2 is used for description. The method includes the following several steps.

Step 301: Process a captured original image based on an ISP parameter, to obtain a target image.

Optionally, that the electronic device captures the original image includes: capturing an optical image by using a camera, and obtaining a digital image signal, namely, the original image, through preprocessing performed by a photosensitive sensor and an analog-to-digital converter.

Optionally, the electronic device captures the optical image in real time or at a preset time interval by using the camera. The preset time interval is set by default or is defined and set by a user. This is not limited in embodiments of this disclosure.

Optionally, that the electronic device processes the captured original image by using an ISP includes: The electronic device performs, by using the ISP, at least one of the following processing operations: black level compensation, lens correction, bad pixel correction, color interpolation, noise removal, white balance correction, color correction, gamma correction, color space conversion (for example, conversion from RGB into YUV), chroma noise removal, edge enhancement, and color and contrast ratio enhancement in YUV color space, and automatic exposure control.

Optionally, an image format of the original image is a Bayer format, and an image format of the target image is a YUV or RGB format.

The ISP parameter is an image signal processing parameter. Optionally, the ISP parameter includes at least one of brightness, a color, a contrast ratio, definition, and noise.

Image quality of the target image is related to the ISP parameter. Optionally, the image quality of the target image indicates performance of the target image in terms of an objective indicator and/or subjective aesthetics.

Optionally, the image quality of the target image indicates an assessed objective quality status and/or an assessed subjective quality status of the target image in a specified dimension. For example, the specified dimension includes at least one of a brightness dimension, a color dimension, a contrast ratio dimension, and a definition and noise dimension.

Step 302: Invoke, based on the target image, a pre-trained image quality assessment model to output and obtain a target assessment result, where the image quality assessment model is a model obtained by training a neural network by using a sample image, and the target assessment result indicates the image quality of the assessed target image.

The electronic device obtains the pre-trained image quality assessment model, and inputs the target image to the image quality assessment model, to output and obtain the target assessment result.

That the electronic device obtains the pre-trained image quality assessment model includes but is not limited to the following two possible implementations.

In a possible implementation, the electronic device pre-trains and store an image quality assessment model. The electronic device obtains the image quality assessment model stored in the electronic device.

In another possible implementation, a server pre-trains and stores an image quality assessment model. The electronic device obtains the image quality assessment model from the server.

The image quality assessment model is a model obtained by training a neural network by using a sample image and a correct assessment result. In other words, the image quality assessment model is determined based on the sample image and the correct assessment result. The correct assessment result includes a pre-labeled assessment result of image quality of the sample image. For example, the neural network is a multi-task convolutional neural network (CNN). A type of the neural network is not limited in embodiments of this disclosure.

The image quality assessment model is used to convert the input target image into the target assessment result. The target assessment result indicates the image quality of the assessed target image.

The image quality assessment model indicates a correlation between the target image and the target assessment result.

The image quality assessment model is a preset mathematical model, and the image quality assessment model includes a model coefficient between the target image and the target assessment result. The model coefficient may be a fixed value, or may be a value dynamically modified with time, or may be a value dynamically modified with a use scenario.

In a possible implementation, the image quality assessment model may be a convolutional neural network model that can assess the image quality of the target image.

It should be noted that, for a training process of the image quality assessment model, refer to the related details in the following embodiments. Details are not described herein.

Optionally, the target assessment result includes objective quality information and/or subjective quality information of the target image. The objective quality information indicates an assessed quality status of the target image in terms of an objective indicator, and the subjective quality information indicates an assessed quality status of the target image in terms of subjective aesthetics.

Optionally, the objective quality information includes an objective score value corresponding to the specified dimension, the subjective quality information includes a subjective score value corresponding to the specified dimension, and the specified dimension includes at least one of the brightness dimension, the color dimension, the contrast ratio dimension, and the definition and noise dimension.

Step 303: Adjust the ISP parameter based on the target assessment result.

The electronic device adjusts the ISP parameter based on the target assessment result, to continuously improve image quality of an output image.

Optionally, the electronic device processes a captured first image based on an adjusted ISP parameter, to obtain a second image. Image quality of the second image is higher than image quality of a third image. The second image is an image processed based on the adjusted ISP parameter, and the third image is an image processed based on the ISP parameter obtained before adjustment.

Optionally, the ISP parameter includes at least one of the brightness, the color, the contrast ratio, the definition, and the noise.

Optionally, that the electronic device adjusts the ISP parameter based on the target assessment result includes: for each specified dimension, determining, based on the objective score value and the subjective score value that correspond to the specified dimension, a target score value corresponding to the specified dimension, and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by a scene classification result.

It should be noted that, for different ISP parameter types, for a manner in which the electronic device adjusts the ISP parameter based on the target assessment result, refer to the related details in the following embodiments. Details are not described herein.

In conclusion, the captured original image is processed based on the ISP parameter, to obtain the target image. The image quality assessment model is invoked based on the target image, to output the target assessment result indicating the image quality. The ISP parameter is automatically adjusted based on the target assessment result. This ensures a debugging effect of the ISP parameter, thereby improving the subsequent image quality obtained after ISP processing.

In a possible implementation, the image quality assessment model includes a scene classification layer, an objective scoring layer, and a subjective scoring layer. The scene classification layer is used to perform scene classification on the target image to output and obtain the scene classification result. The objective scoring layer is used to perform objective scoring on the target image based on the scene classification result, to obtain the objective quality information. The subjective scoring layer is used to perform subjective scoring on the target image based on the scene classification result, to obtain the subjective quality information. In a possible implementation, as shown in FIG. 4, the image processing method includes but is not limited to the following steps: 1. Capture the original image. 2. Perform ISP optimization on the original image to obtain an optimized target image. 3. Perform scene classification on the target image, that is, input the target image to the scene classification layer of the image quality assessment model to output and obtain the scene classification result. 4. Perform image quality assessment based on the target image and the scene classification result, that is, input the target image and the scene classification result to the objective scoring layer to output and obtain objective quality information, and input the target image and the scene classification result to the subjective scoring layer to output and obtain subjective quality information. 5. Automatically adjust the ISP parameter based on the objective quality information and the subjective quality information. The method may further include: 6. When the ISP outputs the target image, automatically label the objective indicator of the target image to obtain label information, to subsequently optimize a training sample set of the image quality assessment model based on the label information. This improves stability and precision of the image quality assessment model.

Figure 5:
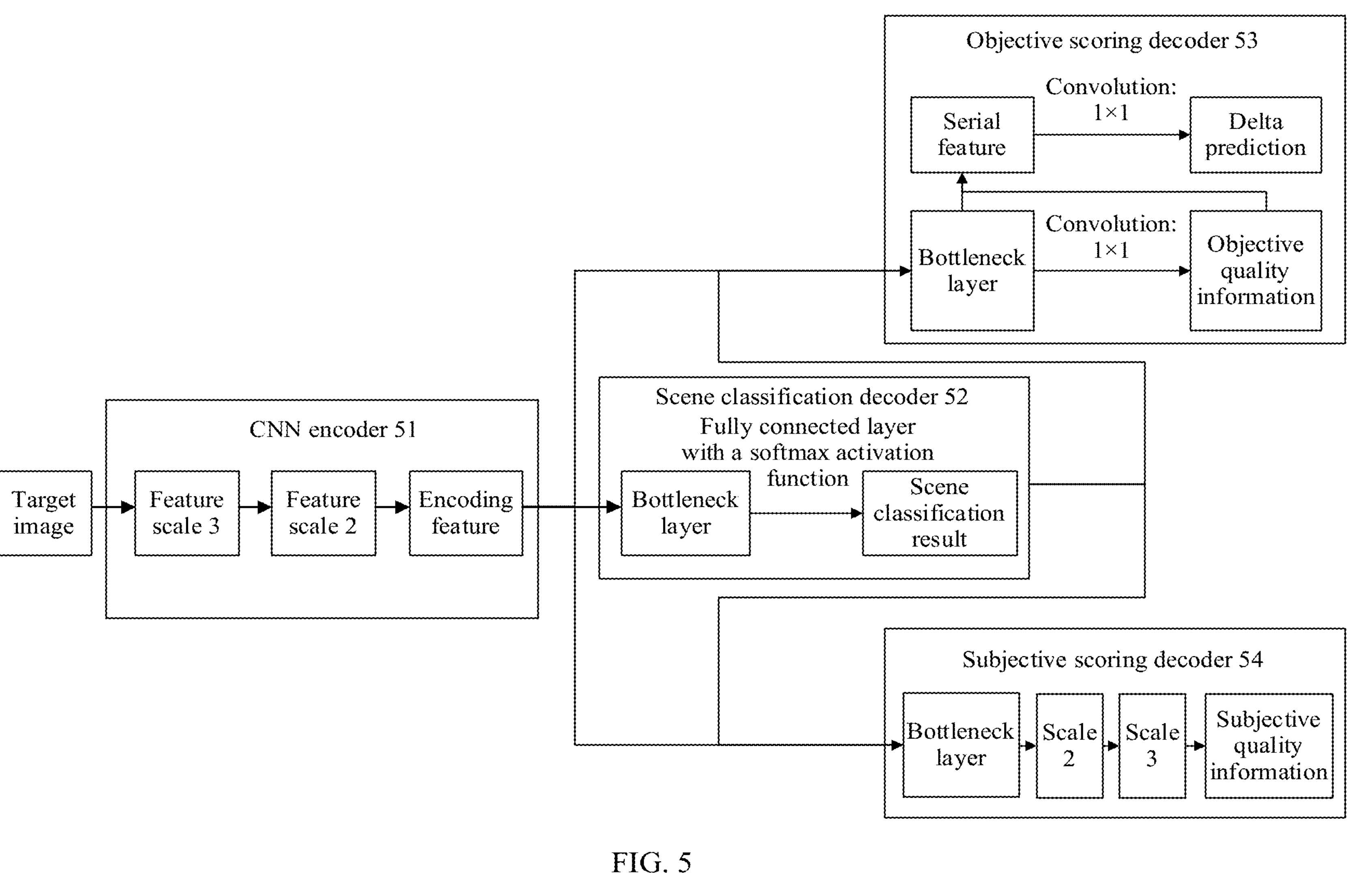
FIG. 5 is a schematic diagram of a structure of an image quality assessment model according to an example embodiment of this disclosure.

For example, the image quality assessment model is a multi-task CNN model. In an example, as shown in FIG. 5, the image quality assessment model includes a CNN encoder 51, a scene classification decoder 52, an objective scoring decoder 53, and a subjective scoring decoder 54. The CNN encoder 51 includes a convolution layer and a pooling layer of a classful network, and performs downsampling by using three convolution layers. The CNN encoder 51 is used to extract an image feature from the target image, and input the extracted image feature to the scene classification decoder 52. The scene classification decoder 52 is also referred to as the scene classification layer, is a fully connected layer with a softmax activation function, and is used to perform scene classification on the target image based on the input image feature, to output and obtain the scene classification result. The objective scoring decoder 53 is also referred to as the objective scoring layer, and is used to perform objective scoring on the target image based on the input scene classification result, to obtain the objective quality information. Based on scale invariance, the objective scoring decoder 53 uses a scaling layer inside to implement precise scoring on the objective indicator. The subjective scoring decoder 54 is also referred to as the subjective scoring layer, and is used to perform subjective scoring on the target image based on the input scene classification result, to obtain the subjective quality information. The subjective scoring decoder 54 performs, based on an encoding feature, upsampling by using three transposed convolution layers.

It should be noted that, before the electronic device obtains the image quality assessment model, the electronic device rains the training sample set to obtain the image quality assessment model. The following describes the training process of the image quality assessment model.

Figures 6, 7:
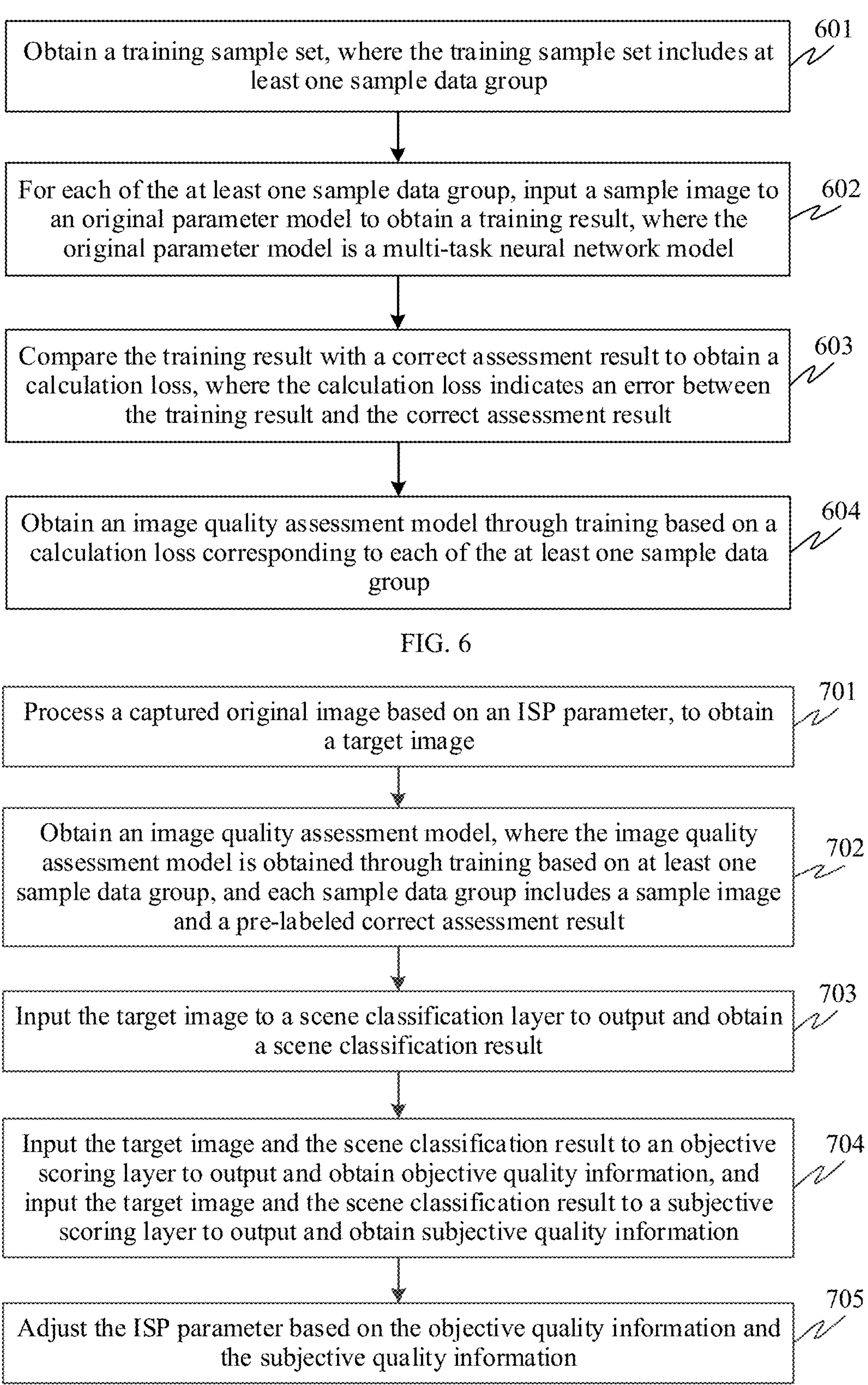
FIG. 6 is a flowchart of a training process of an image quality assessment model according to an example embodiment of this disclosure.
FIG. 7 is a flowchart of an image processing method according to another example embodiment of this disclosure.

In a possible implementation, as shown in FIG. 6, the training process of the image quality assessment model includes the following steps.

Step 601: Obtain the training sample set, where the training sample set includes at least one sample data group.

The image quality assessment model is obtained through training based on the at least one sample data group. Each sample data group includes a sample image and a pre-labeled correct assessment result.

The sample image is an image in an image database. The correct assessment result includes a pre-labeled assessment result of image quality of the sample image.

Step 602: For each of the at least one sample data group, input the sample image to an original parameter model to obtain a training result, where the original parameter model is a multi-task neural network model.

Optionally, the original parameter model is established based on a neural network model. For example, the original parameter model is established based on a CNN model.

For example, for each sample data group, the electronic device creates an input-output pair corresponding to the sample data group. An input parameter of the input-output pair is a sample image in the sample data group, and a target parameter is a correct assessment result of the sample data group. The electronic device inputs the input parameter to the original parameter model to obtain the training result.

Optionally, the input-output pair is indicated by using a characteristic vector.

Step 603: Compare the training result with the correct assessment result to obtain a calculation loss, where the calculation loss indicates an error between the training result and the correct assessment result.

In a possible implementation, the calculation loss is a sum of calculation losses respectively corresponding to a scene class, a subjective indicator, and the objective indicator. For each sample data group, the training result includes a scene classification prediction result, subjective quality prediction information, and objective quality prediction information, and the correct assessment result includes a correct scene classification result, correct subjective quality information, and correct objective quality information. The correct subjective quality information includes a correct subjective score value corresponding to the specified dimension, and the correct objective quality information includes a correct objective score value corresponding to the specified dimension.

Optionally, a cross entropy is used as the calculation loss corresponding to a scene class. A formula for calculating the calculation loss $\mathrm{Loss}_{class}(p, q)$ is as follows:

$$\mathrm{Loss}_{class}(p, q) = -\frac{1}{|I|}\sum_{i \in I}\sum_{i \in I} q_i(c) lg p_i(c)$$

Herein, p is the scene classification prediction result, q is the correct scene classification result, and c is a set of scene types.

Optionally, a sum of a cross entropy of confidence and a loss of the objective indicator is used as the calculation loss corresponding to the objective indicator. A formula for calculating the calculation loss $\mathrm{Loss}_{box}(p, q)$ is as follows:

$$\mathrm{Loss}_{box}(p,q)=\frac{1}{|I|}\sum_{i\in I}\delta_{qi}(|x_{pi}-x_{qi}|+|y_{pi}-y_{qi}|+|m_{pi}-m_{qi}|+|n_{pi}-n_{qi}|)$$

Herein, p is the objective quality prediction information, q is the correct objective quality information, x, y, m, and n respectively indicate the brightness dimension, the color dimension, the contrast ratio dimension, and the definition and noise dimension, i indicates a single scene, a value of i is a positive integer, and I indicates the set of scene types.

Optionally, an empirical mode decomposition-based loss (EMD-based loss) is used as the calculation loss corresponding to the subjective indicator, that is, a score histogram is generated for prediction for the sample image based on a probability distribution of human assessment on the sample image. A formula for calculating the calculation loss EMD (p, p̂) is as follows:

$$EMD(p,\hat{p})=\left(\frac{1}{N}\left|CDF_P(k)-CDF_{\hat{p}}(k)\right|^r\right)^{1/r}$$

Herein, p is the subjective quality prediction information, p̂ is the correct subjective quality information, k is a set of a specified indicator, r indicates a power of a root, and r is a preset fixed value. $CDF_p(k)$ indicates an accumulated value of probabilities of predicted subjective scores. A larger predicted subjective score indicates a larger value of $CDF_p(k)$. In a prediction process, a softmax function is used to ensure that each independent probability is greater than 0.

Step 604: Obtain the image quality assessment model through training based on a calculation loss corresponding to each of the at least one sample data group.

Optionally, the electronic device determines a gradient direction of the image quality assessment model based on the calculation loss and a backpropagation algorithm, and forwardly updates a model parameter in the image quality assessment model layer by layer from an output layer of the image quality assessment model.

Image quality assessment is performed on the target image based on the image quality assessment model that is trained in the foregoing embodiment. FIG. 7 is a flowchart of an image processing method according to another example embodiment of this disclosure. In this embodiment, an example in which the method is applied to the electronic device shown in FIG. 1 is used for description. The method includes the following several steps.

Step 701: Process a captured original image based on an ISP parameter, to obtain a target image.

It should be noted that, for a process in which the electronic device processes the captured original image based on the ISP parameter, to obtain the target image, refer to the related details in the foregoing embodiment. Details are not described herein again.

Step 702: Obtain an image quality assessment model, where the image quality assessment model is obtained through training based on at least one sample data group, and each sample data group includes a sample image and a pre-labeled correct assessment result.

It should be noted that, for a training process of the image quality assessment model, refer to the related details in the foregoing embodiment. Details are not described herein again.

Step 703: Input the target image to a scene classification layer, and output and obtain a scene classification result.

The electronic device inputs the target image to the scene classification layer and outputs and obtains the scene classification result. The scene classification result of the target image uniquely indicates, in a scene type set, a scene type corresponding to the target image.

Optionally, the scene classification layer is used to determine, based on a color temperature and photosensibility (ISO) of the target image, the scene type corresponding to the target image. The color temperature may have seven values, for example, D75, D65, D50, TL84, A, and H. A curve fitting the color temperature can match the color temperature in an all-weather traffic scene of autonomous driving. The photosensibility may have three ranges, for example, low photosensibility that is lower than ISO 800, medium photosensibility that is from ISO 800 to ISO 6400, and high photosensibility that is higher than ISO 6400. Alternatively, the ISO may have 16 ranges, for example, 16 ranges of ISO 100, ISO 200, ISO 400, ISO 800, ISO 1600, ISO 3200, ISO 6400, ISO 12800, ISO 25600, ISO 51200, ISO 102400, ISO 204800, ISO 409600, ISO 819200, ISO 1638400, and ISO 3276800, which basically cover an all-weather lighting condition in a traffic scene of autonomous driving. Based on the two parameters, namely, the color temperature and the photosensibility, a requirement of the all-weather scene of autonomous driving is basically covered.

In a possible implementation, the scene type set includes five scene types: a scene type 1 "noon", a scene type 2 "morning and afternoon", a scene type 3 "early morning and late afternoon", a scene type 4 "basement and tunnel", and a scene type 5 "night". A classification manner for the scene types is not limited in embodiments of this disclosure.

Step 704: Input the target image and the scene classification result to an objective scoring layer to output and obtain objective quality information, and input the target image and the scene classification result to a subjective scoring layer to output and obtain subjective quality information.

Optionally, the objective quality information includes an objective score value corresponding to a specified dimension, and the specified dimension includes at least one of a brightness dimension, a color dimension, a contrast ratio dimension, and a definition and noise dimension.

The objective scoring layer is used to perform, based on the scene classification result, objective indicator scoring on white balance of the target image to obtain an objective score value of the brightness dimension, and/or perform objective indicator scoring on color reproduction of the target image to obtain an objective score value of the color dimension, and/or perform objective indicator scoring on a texture detail of the target image to obtain an objective score value of the contrast ratio dimension, and/or perform objective indicator scoring on definition and a signal-to-noise ratio of the target image to obtain an objective score value of the definition and noise dimension.

Optionally, the objective scoring layer includes a deep object detection neural network, and is used to perform, based on the scene classification result, objective indicator scoring on image quality of the target image to obtain the objective quality information, so that an image quality level can be quantitatively analyzed based on an objective indicator of a description dimension of the image quality of the target image.

Optionally, the subjective quality information includes a subjective score value corresponding to the specified dimension, and the specified dimension includes at least one of the brightness dimension, the color dimension, the contrast ratio dimension, and the definition and noise dimension. The subjective score is given based on subjective aesthetics. Subjective aesthetics is an important factor of aesthetic quality in a hue, a contrast ratio, and image noise removal, and a parameter of the hue, the contrast ratio, or image noise removal that is almost an optimal setting in aesthetics can be found by using a multi-layer Laplace filter.

The subjective scoring layer is used to perform, based on the scene classification result, subjective indicator scoring on the white balance of the target image to obtain a subjective score value of the brightness dimension, and/or perform subjective indicator scoring on the color reproduction of the target image to obtain a subjective score value of the color dimension, and/or perform subjective indicator scoring on the texture detail of the target image to obtain a subjective score value of the contrast ratio dimension, and/or perform subjective indicator scoring on the definition and the signal-to-noise ratio of the target image to obtain a subjective score value of the definition and noise dimension.

Optionally, the subjective scoring layer includes a deep object detection neural network and a semantic segmentation neural network, and is used to perform, based on the scene classification result, subjective indicator scoring on the image quality of the target image to obtain the subjective quality information, so that distribution of a comment of human assessment on the image can be predicted from a direct perception (a technical perspective) and an attractiveness (an aesthetic perspective).

In a possible implementation, the target image is any sample image in a training sample set. When outputting the target image, the ISP automatically labels an objective indicator of the target image to obtain label information, so as to subsequently optimize the training sample set of the image quality assessment model based on the label information.

Optionally, the target image is automatically labeled to obtain the label information. The label information includes an objective label value corresponding to the specified dimension. The training sample set is screened based on the label information, to obtain a screened training sample set. The image quality assessment model is trained based on the screened training sample set, to obtain an updated image quality assessment model.

Optionally, that the training sample set is screened based on the label information, to obtain a screened training sample set includes: When the objective label value corresponding to the specified dimension meets a preset removal condition, the target image is removed from the training sample set to obtain the screened training sample set.

For example, the preset removal condition includes that an absolute value of a difference between the objective label value corresponding to the specified dimension and a pre-labeled correct objective score value is greater than a first preset threshold. The first preset threshold is set by default, or is defined and set by a user. This is not limited in embodiments of this disclosure.

For example, the preset removal condition includes that the objective label value corresponding to the specified dimension is greater than a second preset threshold. The second preset threshold is set by default, or is defined and set by a user. This is not limited in embodiments of this disclosure.

Optionally, at least one candidate sample data group is obtained. Each candidate sample data group includes a candidate sample image and a pre-labeled correct assessment result. The at least one candidate sample data group is added to the screened training sample set, and the image quality assessment model is trained based on a training sample set obtained after adding of the at least one candidate sample data group, to obtain an updated image quality assessment model. This method can continuously increase a quantity of samples in the training sample set, optimize sample quality, and enhance stability and precision of the image quality assessment model.

Optionally, the label information includes the objective label value corresponding to the specified dimension, and the specified dimension includes at least one of the brightness dimension, the color dimension, the contrast ratio dimension, and the definition and noise dimension.

Optionally, the specified dimension includes the brightness dimension. An objective label value corresponding to the brightness dimension includes a brightness deviation value. The brightness deviation value indicates an exposure situation. An average value and a variance of the target image on a grayscale image are separately calculated for different scene types. When abnormal brightness exists, the average value deviates from an average point interval, and the variance is also relatively small. The brightness deviation value of the target image is determined by calculating the average value and the variance of the grayscale image.

For example, the average value and the variance of the target image on the grayscale image are calculated. When abnormal brightness exists, the average value deviates from an average point (which may be assumed to be 128), and the variance is also relatively small. Whether the target image is overexposed or underexposed is determined by calculating the average value and the variance of the grayscale image. For example, the second preset threshold is 1. A brightness deviation value smaller than 1 or equal to 1 indicates that brightness of the target image is normal, and the target image is not removed. A brightness deviation value greater than 1 indicates that brightness of the target image is abnormal, and the target image is removed from the training sample set. For another example, different thresholds are set for different scene types. A brightness deviation value greater than a third preset threshold indicates that brightness of the target image is excessively high. A brightness deviation value smaller than a fourth preset threshold indicates that the brightness of the target image is excessively low. The third preset threshold is greater than the fourth preset threshold.

Optionally, the specified dimension includes the color dimension. An objective label value corresponding to the color dimension includes a color cast value. For example, the target image is an RGB image. The RGB image is converted into an International Commission on Illumination (CIE) L*a*b* space, where L indicates brightness of an image, a indicates a red/green component of the image, and b indicates a yellow/blue component of the image. Generally, for an image with a color cast, an average value of the components a and b is far away from an origin, and a variance is small. The color cast value of the target image is determined by calculating an average value and a variance of components a and b of the target image.

Optionally, the specified dimension includes the contrast ratio dimension. An objective label value corresponding to the contrast ratio dimension includes a gamma value.

Optionally, the specified dimension includes the definition and noise dimension. Objective label values corresponding to the definition and noise dimension include a Brenner gradient and a peak signal-to-noise ratio.

Optionally, after the image quality assessment model is invoked based on the target image to output and obtain a target assessment result, the method further includes: The electronic device adds the target image and the target assessment result to a training sample set to obtain an updated training sample set, and trains the image quality assessment model based on the updated training sample set to obtain an updated image quality assessment model.

Step 705: Adjust the ISP parameter based on the objective quality information and the subjective quality information.

Optionally, the ISP parameter includes at least one of brightness, a color, a contrast ratio, definition, and noise, and the adjusting the ISP parameter based on the target assessment result includes: for each specified dimension, determining, based on an objective score value and a subjective score value that correspond to the specified dimension, a target score value corresponding to the specified dimension, and adjusting, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

Optionally, the target score value corresponding to the specified dimension is determined based on the objective score value and the subjective score value corresponding to the specified dimension, a first weight value of the objective score value, and a second weight value of the subjective score value. The first weight value of the objective score value and the second weight value of the subjective score value are set by default, or are defined and set by a user. This is not limited in embodiments of this disclosure.

Optionally, the training sample set is updated based on an adjusted ISP parameter, and the image quality assessment model is trained based on an updated training sample set, to obtain an updated image quality assessment model.

In conclusion, the multi-task image processing method in the field of autonomous driving proposed in this solution can automatically optimize ISP parameters in different scene types, improve image quality in each scene, and automatically adapt to an all-weather scene of autonomous driving, thereby meeting an image quality requirement of an autonomous driving perception algorithm. In addition, an objective indicator automatic labeling method is provided. The objective label value of the target image in the specified dimension can be automatically labeled, and the training sample set is screened based on the label information. In this way, quality of samples in the training sample set is improved, and the quantity of samples can be continuously increased to enhance stability of the image quality assessment model, thereby improving precision of the image processing method.

Figures 8, 9:
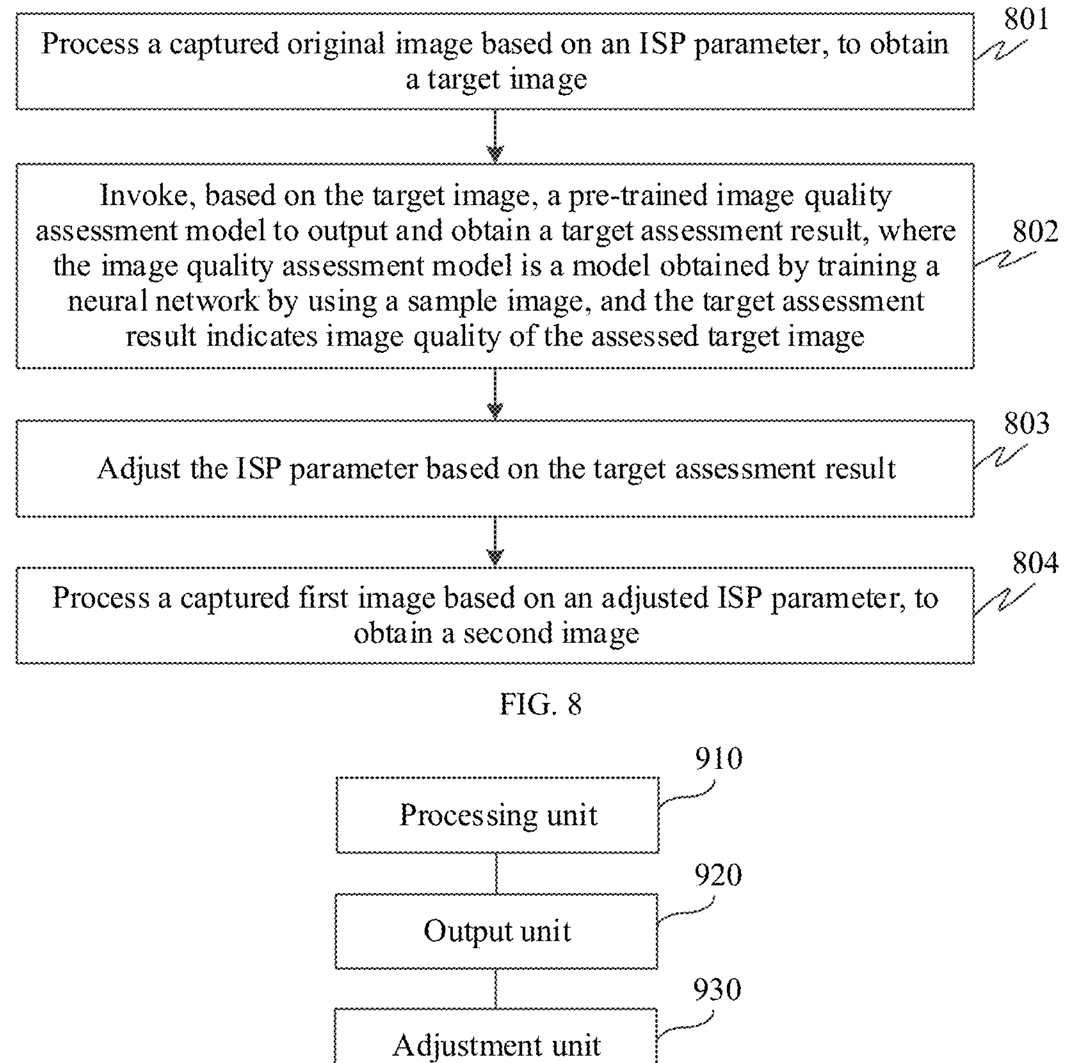
FIG. 8 is a flowchart of an image processing method according to another example embodiment of this disclosure.
FIG. 9 is a block diagram of an image processing apparatus according to an example embodiment of this disclosure.

FIG. 8 is a flowchart of a method for automatically improving image quality according to an example embodiment of this disclosure. In this embodiment, an example in which the method is applied to the electronic device shown in FIG. 1 is used for description. The method includes the following several steps.

Step 801: Process a captured original image based on an ISP parameter, to obtain a target image.

Step 802: Invoke, based on the target image, a pre-trained image quality assessment model to output and obtain a target assessment result, where the image quality assessment model is a model obtained by training a neural network by using a sample image, and the target assessment result indicates image quality of the assessed target image.

Step 803: Adjust the ISP parameter based on the target assessment result.

It should be noted that, for a process in which the electronic device adjusts the ISP parameter based on the target assessment result output by the image quality assessment model, refer to the related details in the foregoing embodiment. Details are not described herein again.

Step 804: Process a captured first image based on an adjusted ISP parameter, to obtain a second image.

Optionally, the electronic device processes the first image based on the adjusted ISP parameter, to obtain the second image. Image quality of the second image is higher than image quality of a third image. The second image is an image processed based on the adjusted ISP parameter, and the third image is an image processed based on the ISP parameter before adjustment.

It should be noted that, for a process in which the electronic device processes the captured first image based on the adjusted ISP parameter to obtain the second image, refer to the related details of the process in which the captured original image is processed based on the ISP parameter to obtain the target image. Details are not described herein again.

The following are apparatus embodiments of this disclosure, and the apparatus embodiments may be used to execute the method embodiments of this disclosure. For details not disclosed in the apparatus embodiments of this disclosure, refer to the method embodiments of this disclosure.

FIG. 9 is a block diagram of an image processing apparatus according to an example embodiment of this disclosure. The apparatus may be implemented as all or a part of an electronic device by using software, hardware, or a combination of software and hardware. The apparatus may include a processing unit 910, an output unit 920, and an adjustment unit 930.

The processing unit 910 is configured to process a captured original image based on an ISP parameter, to obtain a target image. Image quality of the target image is related to the ISP parameter.

The output unit 920 is configured to invoke, based on the target image, a pre-trained image quality assessment model to output and obtain a target assessment result. The image quality assessment model is a model obtained by training a neural network by using a sample image, and the target assessment result indicates the image quality of the assessed target image.

The adjustment unit 930 is configured to adjust the ISP parameter based on the target assessment result.

In a possible implementation, the target assessment result includes objective quality information and subjective quality information of the target image.

The objective quality information indicates an assessed quality status of the target image in terms of an objective indicator, and the subjective quality information indicates an assessed quality status of the target image in terms of subjective aesthetics.

In another possible implementation, the image quality assessment model includes a scene classification layer, an objective scoring layer, and a subjective scoring layer, and the output unit 920 is further configured to: input the target image to the scene classification layer to output and obtain a scene classification result; and input the target image and the scene classification result to the objective scoring layer to output and obtain the objective quality information, and input the target image and the scene classification result to the subjective scoring layer to output and obtain the subjective quality information.

In another possible implementation, the objective quality information includes an objective score value corresponding to a specified dimension, the subjective quality information includes a subjective score value corresponding to the specified dimension, and the specified dimension includes at least one of a brightness dimension, a color dimension, a contrast ratio dimension, and a definition and noise dimension.

In another possible implementation, the ISP parameter includes at least one of brightness, a color, a contrast ratio, definition, and noise, and the adjustment unit 930 is further configured to: for each specified dimension, determine, based on an objective score value and a subjective score value that correspond to the specified dimension, a target score value corresponding to the specified dimension; and adjust, based on the target score value corresponding to the specified dimension and a preset parameter threshold, the ISP parameter corresponding to the specified dimension, where the preset parameter threshold is a preset parameter threshold of the specified dimension in terms of a scene type indicated by the scene classification result.

In another possible implementation, the apparatus further includes an obtaining unit.

The obtaining unit is configured to obtain the image quality assessment model. The image quality assessment model is obtained through training based on at least one sample data group, and each sample data group includes the sample image and a pre-labeled correct assessment result.

In another possible implementation, the apparatus further includes a training unit, and the training unit is configured to: obtain a training sample set, where the training sample set includes the at least one sample data group; for each of the at least one sample data group, input the sample image to an original parameter model to obtain a training result, where the original parameter model is a multi-task neural network model; compare the training result with the correct assessment result to obtain a calculation loss, where the calculation loss indicates an error between the training result and the correct assessment result; and obtain the image quality assessment model through training based on a calculation loss corresponding to each of the at least one sample data group.

In another possible implementation, the apparatus further includes a training unit, and the retraining unit is configured to: perform automatic labeling on the target image to obtain label information, where the label information includes an objective label value corresponding to the specified dimension; perform screening in the training sample set based on the label information, to obtain a screened training sample set; and train the image quality assessment model based on the screened training sample set, to obtain an updated image quality assessment model.

It should be noted that, when the apparatus provided in the foregoing embodiments implements the functions of the apparatus, division of the foregoing function modules is only used as an example for description. In actual application, the foregoing functions may be allocated to different function modules for implementation as required, that is, an inner structure of a device is divided into different function modules, to implement all or some of the functions described above. In addition, the apparatus provided in the foregoing embodiments and the method embodiments belong to a same concept. For specific implementation processes thereof, refer to the method embodiments. Details are not described herein again.

An embodiment of this disclosure provides a camera. The camera includes an ISP and a processor. The processor is configured to perform the foregoing methods performed by the electronic device.

An embodiment of this disclosure provides a vehicle. The vehicle includes a processor, and a memory configured to store instructions executable by the processor. When the processor is configured to execute the instructions, the methods performed by the electronic device are implemented.

An embodiment of this disclosure provides a computer program product, including computer-readable code or a non-volatile computer-readable storage medium carrying computer-readable code. When the computer-readable code is run in a processor of an electronic device, the processor in the electronic device performs the foregoing methods performed by the electronic device.

An embodiment of this disclosure provides a non-volatile computer-readable storage medium, storing computer program instructions. When the computer program instructions are executed by a processor, the foregoing methods performed by the electronic device are implemented.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination thereof. More specific examples (a non-exhaustive list) of the computer-readable storage medium include: a portable computer disk, a hard disk, a random-access memory (RAM), a read-only memory (ROM), an erasable programmable read-only memory (EPROM, or a flash memory), a static random-access memory (SRAM), a portable compact disk read-only memory (CD-ROM), a digital video disk (DVD), a memory stick, a floppy disk, a mechanical coding device, for example, a punching card or a groove protrusion structure that stores instructions, and any suitable combination thereof.

Computer-readable program instructions or code described herein can be downloaded to respective computing/processing devices from the computer-readable storage medium, or downloaded to an external computer or external storage device through a network, for example, an internet, a local area network, a wide area network and/or a wireless network. The network may include a copper transmission cable, optical fiber transmission, wireless transmission, a router, a firewall, a switch, a gateway computer and/or an edge server. A network adapter card or network interface in each computing/processing device receives the computer-readable program instructions from the network and forwards the computer-readable program instructions for storage in a computer-readable storage medium in each computing/processing device.

The computer program instructions used to perform the operations in this disclosure may be assembly instructions, instruction set architecture (ISA) instructions, machine instructions, machine-related instructions, microcode, firmware instructions, status setting data, or source code or object code written in one programming language or any combination of more programming languages. The programming languages include an object-oriented programming language, for example, Smalltalk or C++, and a procedural programming language, for example, a "C" language or a similar programming language. The computer-readable program instructions may be executed entirely on a user computer, partly on the user computer, as a stand-alone software package, partly on the user computer and partly on a remote computer, or entirely on the remote computer or a server. In a case involving a remote computer, the remote computer may be connected to a user computer over any kind of network, including a local area network (LAN) or a wide area network (WAN), or may be connected to an external computer (for example, connected over an internet using an internet service provider). In some embodiments, an electronic circuit, for example, a programmable logic circuit, a field-programmable gate array (FPGA), or a programmable logic array (PLA), is customized by using status information of the computer-readable program instructions. The electronic circuit may execute the computer-readable program instructions, to implement various aspects of this disclosure.

The various aspects of this disclosure are described herein with reference to the flowcharts and/or block diagrams of the methods, the apparatus (the system), and the computer program product according to embodiments of this disclosure. It should be understood that each block of the flowcharts and/or block diagrams and a combination of blocks in the flowcharts and/or block diagrams may be implemented by the computer-readable program instructions.

These computer-readable program instructions may be provided to a processor of a general-purpose computer, a dedicated computer, or another programmable data processing apparatus to produce a machine, so that the instructions, when executed by the processor of the computer or the other programmable data processing apparatus, create an apparatus for implementing functions/acts specified in one or more blocks in the flowcharts and/or block diagrams. These computer-readable program instructions may alternatively be stored in the computer-readable storage medium. These instructions enable a computer, a programmable data processing apparatus, and/or another device to work in a specific manner. Therefore, the computer-readable medium storing the instructions includes an artifact that includes instructions for implementing the various aspects of the functions/acts specified in the one or more blocks in the flowcharts and/or the block diagrams.

The computer-readable program instructions may alternatively be loaded onto a computer, another programmable data processing apparatus, or another device so that a series of operation steps is performed on the computer, the other programmable data processing apparatus, or the other device to produce a computer-implemented process. Therefore, the instructions executed on the computer, the other programmable data processing apparatus, or the other device implements the functions/acts specified in the one or more blocks in the flowcharts and/or block diagrams.

The flowcharts and block diagrams in the accompanying drawings show possible implementations of system architectures, functions, and operations of apparatuses, systems, methods, and computer program products according to a plurality of embodiments of this disclosure. In this regard, each block in the flowcharts or block diagrams may indicate a module, a program segment, or a part of the instructions, and the module, the program segment, or the part of the instructions includes one or more executable instructions for implementing a specified logical function. In some alternative implementations, a function marked in the block may alternatively occur in an order different from that marked in the accompanying drawings. For example, two consecutive blocks may actually be executed substantially in parallel, and may sometimes be executed in a reverse order, depending on a function involved.

It should also be noted that each block in the block diagrams and/or the flowcharts, and a combination of blocks in the block diagram and/or the flowchart may be implemented by hardware (for example, a circuit or an ASIC (application-specific integrated circuit)) that performs a corresponding function or action, or may be implemented by a combination of hardware and software, for example, firmware.

Although this disclosure is described with reference to embodiments, in a process of implementing this disclosure that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a plurality. A single processor or another unit may implement several functions enumerated in the claims. Some measures are recorded in dependent claims that are different from each other, but this does not mean that these measures cannot be combined to produce a better effect.

The foregoing has described embodiments of this disclosure. The foregoing descriptions are examples, not exhaustive, and are not limited to the disclosed embodiments. Many modifications and changes are apparent to a person of ordinary skill in the art without departing from the scope of the described embodiments. The selection of terms used herein is intended to best explain the principles of embodiments, practical applications, or improvements to technologies in the market, or to enable another person of ordinary skill in the art to understand embodiments disclosed herein.

What is claimed is:

1. A method implemented by a processor, wherein the method comprises: training, by using a sample image, a neural network to obtain a pre-trained image quality assessment model, wherein the pre-trained image quality assessment model comprises a scene classification layer, an objective scoring layer, and a subjective scoring layer; processing, based on an image signal processor (ISP) parameter, a captured original image, to obtain a target image; invoking, based on the target image, the pre-trained image quality assessment model to obtain a target assessment result, wherein the target assessment result indicates image quality of the target image, and wherein invoking the pre-trained image quality assessment model comprises: inputting the target image to the scene classification layer to obtain a scene classification result; inputting the target image and the scene classification result to the objective scoring layer to obtain objective quality information; and inputting the target image and the scene classification result to the subjective scoring layer to obtain subjective quality information; and adjusting, based on the target assessment result, the ISP parameter thereby improving subsequent image quality of the target image.

2. The method of claim 1, wherein the target assessment result comprises: the objective quality information of the target image that indicates a first assessed quality status of the target image in terms of an objective indicator; and the subjective quality information of the target image that indicates a second assessed quality status of the target image in terms of subjective aesthetics.

3. The method of claim 2, wherein the objective quality information comprises an objective score value corresponding to a specified dimension, wherein the subjective quality information comprises a subjective score value corresponding to the specified dimension, and wherein the specified dimension comprises at least one of a brightness dimension, a color dimension, a contrast ratio dimension, or a definition and noise dimension.

4. The method of claim 3, wherein the ISP parameter comprises at least one of brightness, a color, a contrast ratio, definition, or noise, and wherein adjusting the ISP parameter comprises:

determining, for each specified dimension and based on the objective score value and the subjective score value that correspond to the specified dimension, a target score value corresponding to the specified dimension; and adjusting, based on the target score value and a preset parameter threshold, the ISP parameter corresponding to the specified dimension, wherein the preset parameter threshold is of the specified dimension in terms of a scene type indicated by a scene classification result.

5. The method of claim 1, wherein before invoking the pre-trained image quality assessment model, the method further comprises obtaining the pre-trained image quality assessment model through training based on at least one sample data group, and wherein each sample data group comprises the sample image and a pre-labeled correct assessment result.

6. The method of claim 5, wherein before obtaining the pre-trained image quality assessment model, the method further comprises:

obtaining a training sample set comprising the at least one sample data group;

inputting, for each of the at least one sample data group, the sample image to an original parameter model to obtain a training result, wherein the original parameter model is a multi-task neural network model;

comparing the training result with the pre-labeled correct assessment result to obtain a calculation loss that indicates an error between the training result and the pre-labeled correct assessment result; and obtaining the pre-trained image quality assessment model through training based on the calculation loss corresponding to each of the at least one sample data group.

7. The method of claim 6, wherein after invoking the pre-trained image quality assessment model, the method further comprises:

performing automatic labeling on the target image to obtain label information comprising an objective label value corresponding to a specified dimension;

performing, based on the label information, screening in the training sample set to obtain a screened training sample set; and training, based on the screened training sample set, the pre-trained image quality assessment model to obtain an updated image quality assessment model.

8. An apparatus, comprising: a memory configured to store programming instructions; and a processor coupled to the memory and configured to execute the programming instructions to cause the apparatus to: process, based on an image signal processor (ISP) parameter, a captured original image to obtain a target image; invoke, based on the target image, a pre-trained image quality assessment model to obtain a target assessment result, wherein the pre-trained image quality assessment model comprises a scene classification layer, an objective scoring layer, wherein the pre-trained image quality assessment model is from training a neural network by using a sample image, and a subjective scoring layer, wherein the target assessment result indicates image quality of the target image, and wherein invoking the pre-trained image quality assessment model comprises: inputting the target image to the scene classification layer to obtain a scene classification result; inputting the target image and the scene classification result to the objective scoring layer to obtain objective quality information; and inputting the target image and the scene classification result to the subjective scoring layer to obtain subjective quality information; and adjust, based on the target assessment result, the ISP parameter thereby improving subsequent image quality of the target image.

9. The apparatus of claim 8, wherein the target assessment result comprises: the objective quality information of the target image that indicates a first assessed quality status of the target image in terms of an objective indicator; and the subjective quality information of the target image that indicates a second assessed quality status of the target image in terms of subjective aesthetics.

10. The apparatus of claim 8, wherein the objective quality information comprises an objective score value corresponding to a specified dimension, wherein the subjective quality information comprises a subjective score value corresponding to the specified dimension, and wherein the specified dimension comprises at least one of a brightness dimension, a color dimension, a contrast ratio dimension, or a definition and noise dimension.

11. The apparatus of claim 10, wherein the ISP parameter comprises at least one of brightness, a color, a contrast ratio, definition, or noise, and wherein the processor is further configured to execute the programming instructions to cause the apparatus to:

determine, for each specified dimension and based on the objective score value and the subjective score value that correspond to the specified dimension, a target score value corresponding to the specified dimension; and adjust, based on the target score value and a preset parameter threshold, the ISP parameter corresponding to the specified dimension, wherein the preset parameter threshold is of the specified dimension in terms of a scene type indicated by a scene classification result.

12. The apparatus of claim 8, wherein the processor is further configured to execute the programming instructions to cause the apparatus to obtain the pre-trained image quality assessment model, wherein the pre-trained image quality assessment model is obtained through training based on at least one sample data group, and wherein each sample data group comprises the sample image and a pre-labeled correct assessment result.

13. The apparatus of claim 12, wherein processor is further configured to execute the programming instructions to cause the apparatus to:

obtain a training sample set comprising the at least one sample data group;

input, for each of the at least one sample data group, the sample image to an original parameter model to obtain a training result, wherein the original parameter model is a multi-task neural network model;

compare the training result with the pre-labeled correct assessment result to obtain a calculation loss that indicates an error between the training result and the pre-labeled correct assessment result; and obtain the pre-trained image quality assessment model through training based on the calculation loss corresponding to each of the at least one sample data group.

14. The apparatus of claim 13, wherein the processor is further configured to execute the programming instructions to cause the apparatus to:

perform automatic labeling on the target image to obtain label information comprising an objective label value corresponding to a specified dimension;

perform, based on the label information, screening in the training sample set to obtain a screened training sample set; and train, based on the screened training sample set, the pre-trained image quality assessment model to obtain an updated image quality assessment model.

15. A computer program product comprising computer-executable instructions that are stored on a non-transitory computer-readable medium and that, when executed by a processor, cause an apparatus to: process, based on an image signal processor (ISP) parameter, a captured original image to obtain a target image; invoke, based on the target image, a pre-trained image quality assessment model to obtain a target assessment result, wherein the pre-trained image quality assessment model is from training a neural network by using a sample image, wherein the pre-trained image quality assessment model comprises a scene classification layer, an objective scoring layer, and a subjective scoring layer, wherein the target assessment result indicates image quality of the target image, and wherein invoking the pre-trained image quality assessment model comprises: inputting the target image to the scene classification layer to obtain a scene classification result; inputting the target image and the scene classification result to the objective scoring layer to obtain objective quality information; and inputting the target image and the scene classification result to the subjective scoring layer to obtain subjective quality information; and adjust, based on the target assessment result, the ISP parameter thereby improving subsequent image quality of the target image.

16. The computer program product of claim 15, wherein the target assessment result comprises: the objective quality information of the target image that indicates a first assessed quality status of the target image in terms of an objective indicator; and the subjective quality information of the target image that indicates a second assessed quality status of the target image in terms of subjective aesthetics.

17. The computer program product of claim 15, wherein the objective quality information comprises an objective score value corresponding to a specified dimension, wherein the subjective quality information comprises a subjective score value corresponding to the specified dimension, and wherein the specified dimension comprises at least one of a brightness dimension, a color dimension, a contrast ratio dimension, or a definition and noise dimension.

18. The computer program product of claim 15, wherein before invoking the pre-trained image quality assessment model, the computer-executable instructions further cause the apparatus to obtain the pre-trained image quality assessment model through training based on at least one sample data group, and wherein each sample data group comprises the sample image and a pre-labeled correct assessment result.

19. The computer program product of claim 18, wherein the computer-executable instructions when executed by the processor further cause the apparatus to: obtain a training sample set comprising the at least one sample data group; input, for each of the at least one sample data group, the sample image to an original parameter model to obtain a training result, wherein the original parameter model is a multi-task neural network model; compare the training result with the pre-labeled correct assessment result to obtain a calculation loss that indicates an error between the training result and the pre-labeled correct assessment result; and obtain the pre-trained image quality assessment model through training based on the calculation loss corresponding to each of the at least one sample data group.

20. The computer program product of claim 19, wherein the computer-executable instructions when executed by the processor further cause the apparatus to: perform automatic labeling on the target image to obtain label information comprising an objective label value corresponding to a specified dimension;

perform, based on the label information, screening in the training sample set to obtain a screened training sample set; and train, based on the screened training sample set, the pre-trained image quality assessment model to obtain an updated image quality assessment model.

* * * * *